US012714017B2

(12) United States Patent
Larsson et al.

(10) Patent No.: US 12,714,017 B2
(45) Date of Patent: Aug. 25, 2026

(54) ROBOTIC LAWNMOWER CUTTER ASSEMBLY, ROBOTIC LAWNMOWER, AND METHOD OF ATTACHING A LAWNMOWER CUTTER ASSEMBLY TO A LAWNMOWER

(71) Applicant: HUSQVARNA AB, Huskvarna (SE)

(72) Inventors: Svante Larsson, Eksjö (SE); Anders Danling, Bankeryd (SE); Mats Svensson, Huskvarna (SE); Albin Ekdahl, Huskvarna (SE); Ronny Olsen, Nässjö (SE); Johan Swalbring, Forserum (SE)

(73) Assignee: HUSQVARNA AB, Huskvarna (SE)

( * ) Notice: Subject to any disclaimer, the term of this patent is extended or adjusted under 35 U.S.C. 154(b) by 820 days.

(21) Appl. No.: 17/923,279

(22) PCT Filed: Apr. 22, 2021

(86) PCT No.: PCT/SE2021/050367
§ 371 (c)(1),
(2) Date: Nov. 4, 2022

(87) PCT Pub. No.: WO2021/225494
PCT Pub. Date: Nov. 11, 2021

(65) Prior Publication Data

US 2023/0225244 A1 Jul. 20, 2023

(30) Foreign Application Priority Data

May 7, 2020 (SE) .................................... 2050522-8

(51) Int. Cl.
*A01D 34/73* (2006.01)
*A01D 34/00* (2006.01)
(Continued)

(52) U.S. Cl.
CPC .......... *A01D 34/733* (2013.01); *A01D 34/008* (2013.01); *A01D 34/661* (2013.01); *A01D 2101/00* (2013.01)

(58) Field of Classification Search
CPC .. A01D 34/733; A01D 34/008; A01D 34/661; A01D 34/73; A01D 2101/00
(Continued)

(56) References Cited

U.S. PATENT DOCUMENTS 2,801,513 A * 8/1957 Olson .................... A01D 34/63 56/295
2,822,657 A * 2/1958 Chaffee ................. A01D 34/63 464/45
(Continued)

FOREIGN PATENT DOCUMENTS

CN 102573446 A 7/2012
CN 202722034 U 2/2013
(Continued)

OTHER PUBLICATIONS

International Search Report and Written Opinion for International Application No. PCT/SE2021/050367 mailed Jun. 18, 2021.
(Continued)

*Primary Examiner* — Joseph M Rocca
*Assistant Examiner* — Sunny D Webb
(74) *Attorney, Agent, or Firm* — Burr & Forman

(57) ABSTRACT

A lawnmower cutter assembly (22) comprises a knife carrier arrangement (26) and a skid plate arrangement (30), which are axially held between an axial stop shoulder (60) of the cutter drive shaft (34) and an end piece (54) rigidly connected to the cutter drive shaft (34), the end piece (54) thereby vertically carrying the skid plate arrangement (30) and the knife carrier arrangement (26). The cutter assembly (22) may be attached to a lawnmower, which may be a
(Continued)

robotic lawnmower, by positioning the knife carrier arrangement (26) and the skid plate arrangement (30) on the cutter drive shaft (34); and thereafter, axially locking the axial position of the knife carrier arrangement (26) and the skid plate arrangement (30) in relation to the cutter drive shaft (34).

18 Claims, 7 Drawing Sheets

(51) Int. Cl.
*A01D 34/66* (2006.01)
*A01D 101/00* (2006.01)

(58) Field of Classification Search
USPC .......................................... 56/295, 17.5, 255
See application file for complete search history.

(56) References Cited

U.S. PATENT DOCUMENTS 3,034,275 A * 5/1962 Happe .................... A01D 34/84 37/189
3,044,241 A * 7/1962 Snider .................. A01D 34/733 56/295
3,157,978 A * 11/1964 Mcmullen ................. F16D 7/02 416/169 R
3,618,304 A * 11/1971 Hundhausen .......... A01D 34/63 56/16.9
3,940,910 A * 3/1976 d'Acremont ........... A01D 43/10 56/14.4
4,084,397 A * 4/1978 McGrath ................ A01D 34/63 474/169
4,292,790 A * 10/1981 Mathews ............... A01D 34/66 56/13.6
5,203,151 A * 4/1993 Mills ...................... A01D 34/54 172/427
7,540,134 B1 * 6/2009 Reich ..................... A01D 34/74 56/14.9
10,517,211 B2 * 12/2019 Öhrlund .................. B60L 1/003
11,925,142 B2 * 3/2024 Schuller-Rach ..... A01D 34/733

FOREIGN PATENT DOCUMENTS

CN 103843514 A 6/2014
CN 209234283 U 8/2019
DE 3526333 C2 * 1/1988 ........... A01D 43/077
EP 272385 A1 6/1988
FR 1440406 A * 5/1966 ............. A01D 34/66
FR 2893221 A1 * 5/2007 ........... A01D 34/733
FR 2923134 A1 * 5/2009 ........... A01D 34/733
GB 1507432 A 4/1978
GB 2159684 A 12/1985
JP S6010429 U 1/1985
WO WO-9624242 A1 * 8/1996 ........... A01D 34/736
WO WO-2006062341 A1 * 6/2006 ............. A01D 34/68
WO WO-2012047176 A1 * 4/2012 ........... A01D 34/733
WO 2015165506 A1 11/2015

OTHER PUBLICATIONS

Office Action and Search Report for Swedish Application No. 2050522-8 mailed on Nov. 30, 2020.

* cited by examiner 16
10
14c
14a
14
14b
13
12

18
A
14c
14b
22c
20
14a
24
22b
D
W
A
18
20
22a

22
C
23
28
26
24
24
31
32
24
C
30
24
24

C
23
28
34
22
40
40
26
26b
40
26a
36
38
27
24
40
K
K
24
P
24
29
32
C
76

22
24
27
30
32
34
38
42
42a
42b
44
46
46a
46b
48
49
50a
50b
50a
50b
51
52
53
54
55
56
57
58
60
61
62
76
80

C
26
26a
22
26b
24
24
27
72
27
24
32
31
42b
66
64
66
66
65
46a
52
42a
68
55
44
44
70
46b
51
30
38
54
59
76
80
78
82
73
74
62
C

C
26
26a
84
24
26b
K
24
27
42b
72
65
31
66
66
64
66
46a
52
32
42a
44
70
46b
55
76
30
78
80
76
51
59
38
54
22
74
62
73
77
C 22
34
26
38
30
C
C 76
80
62
42b
144
42a

Fig. 9
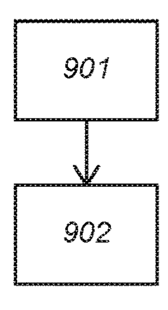
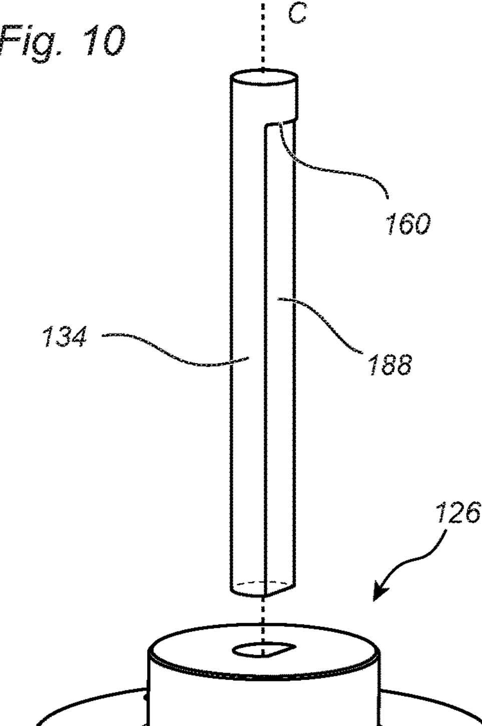
Fig. 11
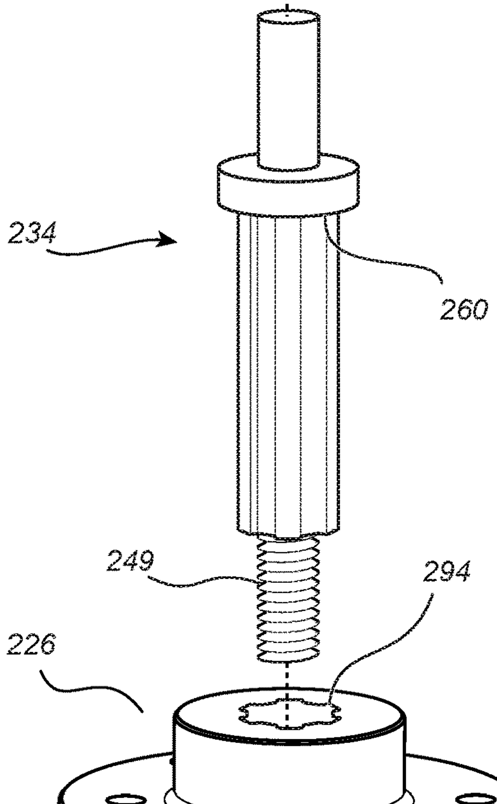
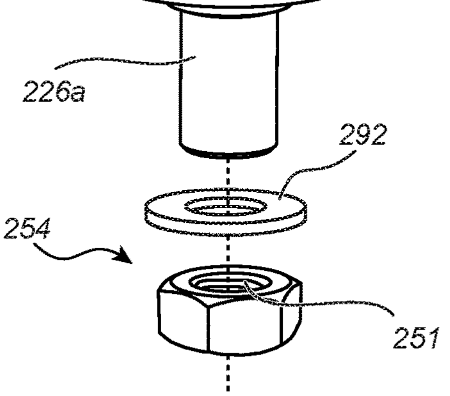

ROBOTIC LAWNMOWER CUTTER ASSEMBLY, ROBOTIC LAWNMOWER, AND METHOD OF ATTACHING A LAWNMOWER CUTTER ASSEMBLY TO A LAWNMOWER

FIELD OF THE INVENTION

The present invention relates to a lawnmower cutter assembly, to a robotic lawnmower comprising such a lawnmower cutter assembly, and to a method of attaching a lawnmower cutter assembly to a lawnmower.

BACKGROUND

Since their introduction on the market, robotic lawnmowers have facilitated lawn maintenance considerably. However, even though robotic lawnmowers facilitate mowing the lawn, like most equipment, they still require some care and maintenance, and may generate some cost during the lifespan of the robotic lawnmower. By way of example, grass cutting knives may require occasional resharpening or replacement. Moreover, robotic lawnmowers consume energy, and keeping energy consumption low may keep operating cost down, and/or enable the robotic lawnmower to treat a relatively larger work area. WO2015165506A1 discloses an energy-efficient robotic lawnmower provided with a cutter assembly configured to carry grass cutting knives. A skid plate keeps friction losses in the engagement between the cutter assembly and the grass low. There is however a need for a robotic lawnmower which may even further reduce the cost of operation. This may be particularly important for large installations, which may involve large areas to be treated, high-capacity robotic lawnmowers, and/or installations comprising more than one robotic lawnmower.

SUMMARY

It is an object of the present invention to solve, or at least mitigate, parts or all of the above mentioned problems. To this end, there is provided a lawnmower cutter assembly adapted to move one or several grass cutting knives in a cutting plane to cut grass, comprising: a knife carrier arrangement configured to carry one or several grass cutting knives, the knife carrier arrangement configured to be rotated about a cutter rotation axis by a cutter drive shaft; a skid plate arrangement comprising a skid plate suspended, when in use, below the knife carrier arrangement, the skid plate arrangement being rotatably connected to the knife carrier arrangement to enable rotation of the knife carrier arrangement in relation to the skid plate about the cutter rotation axis, wherein the skid plate arrangement and the knife carrier arrangement are configured to be axially held, when in use, between an axial stop shoulder of the cutter drive shaft and an end piece rigidly connected to the cutter drive shaft, the end piece thereby vertically carrying the skid plate arrangement and the knife carrier arrangement. Thereby, removal of the end piece may axially release both the knife carrier arrangement and the skid plate arrangement, allowing them both to be removed in a single operation, which facilitates service. The skid plate may be circular. According to embodiments, the skid plate may be flat; for example, it may be cut from a single piece of sheet metal. The skid plate may typically be shaped to cover the knife carrier arrangement from below in such a manner that the knife carrier arrangement does not substantially engage with the grass to be cut, whereas the knives carried by the knife carrier arrangement extend radially beyond the skid plate. The lawnmower cutter assembly may be attached to a wheeled lawnmower, which may be of self-propelled type or configured to be pushed by an operator. The end piece may be removably attached to the cutter drive shaft.

According to embodiments, the lawnmower cutter assembly may be configured to be axially clamped against the axial stop shoulder by the end piece. Thereby, a firm and precise positioning of the skid plate arrangement and the knife carrier arrangement may be ascertained. According to embodiments, the knife carrier arrangement and/or any bearing arrangement of the lawnmower cutter assembly may be configured to be vertically clamped between the end piece and the axial stop shoulder, whereas the skid plate arrangement may be axially locked to the knife carrier arrangement, for example via a bearing arrangement.

According to embodiments, the end piece may be concentric with the cutter rotation axis. Such an embodiment is particularly well suited for an arrangement comprising only one single end piece.

According to embodiments, the knife carrier arrangement may have a keyed interface for rotationally locking the knife carrier arrangement to the cutter drive shaft. The keyed interface may comprise teeth facing axially, to mesh with mating, axially facing teeth of the cutter drive shaft, for example in a Hirth-type interface manner. Alternatively or additionally, the keyed interface may comprise teeth facing radially, such as splines. The keyed interface may have a functionally and/or geometrically uniform profile along the rotation axis, thereby enabling an adjustable axial position of the knife carrier arrangement on the cutter drive shaft, while rotationally locking the knife carrier to the cutter drive shaft.

According to embodiments, the knife carrier arrangement may comprise a shaft socket configured to receive the cutter drive shaft.

According to embodiments, the shaft socket may have a cross-section shaped to mate with a D-shaped cutter drive shaft.

According to embodiments, the shaft socket may comprise an alignment section which tapers axially downwards. The tapering section may radially align the knife carrier arrangement to the cutter drive shaft when the knife carrier arrangement is pressed upwards, towards the cutter drive shaft.

According to embodiments, the skid plate arrangement may be rotatably connected to the knife carrier arrangement via a bearing arrangement comprising at least one bearing having an inner race rotationally fixed to the cutter drive shaft, and an outer race rotationally fixed to the skid plate arrangement.

According to embodiments, the inner race of the bearing may be clamped towards the axial stop shoulder by the end piece. The inner race of the bearing may be clamped either into direct abutment with the axial stop shoulder, or may be clamped against the axial stop shoulder via another axially rigid structure, such as the knife carrier arrangement. The bearing arrangement may comprise two coaxial bearings separated along the cutter rotation axis. The two coaxial bearings may be axially separated by a support sleeve.

According to embodiments, the end piece may axially abut the bearing arrangement, and the bearing arrangement may axially abut the knife carrier arrangement.

According to embodiments, the skid plate arrangement may comprise a bearing housing. The skid plate may be integrally formed with the bearing housing. Alternatively, it may be fixedly attached to the bearing housing, for example by means of screws.

According to embodiments, the skid plate arrangement may comprise a skid plate clamp arrangement comprising a lower skid plate clamping element and an upper skid plate clamping element, which skid plate clamping elements clamp the skid plate between them.

According to embodiments, the bearing housing may be integrally formed with the lower skid plate clamping element.

According to embodiments, clamping screws may be screwed into the lower skid plate clamping element from above. Such an arrangement protects the clamping screws from dirt, and reduces the risk of erroneous disassembly of the lawnmower cutter assembly. The clamping screws may penetrate the upper skid plate clamping element to engage with the lower skid plate clamping element. Alternatively, screw heads of the clamping screws may themselves form the upper skid plate clamping elements.

According to embodiments, at least one of the lower and upper skid plate clamping elements may define an end piece housing, and the lawnmower cutter assembly may further comprise an end piece lid movable between a closed position, in which it covers a lower side of the end piece housing, and an open position, in which it exposes the end piece for access from below. Thereby, the end piece may be protected from dirt, and still remain accessible via the end piece lid in the event it needs to be removed or manipulated. The end piece may be housed in the same housing as the bearing defined hereinabove. Hence, the end piece housing may also be a bearing housing.

According to embodiments, the end piece lid may comprise a bayonet interface for connecting to a mating bayonet interface of the end piece housing, wherein a tangential, with regard to the cutter rotation axis, wall of the end piece housing is provided with at least one skid plate access aperture, and the skid plate may comprise a central aperture provided with at least one support tab extending radially inwards, through the skid plate access aperture, wherein the bayonet interface of the end piece lid is configured to, when the end piece lid is in the closed position, be axially supported by the support tab. Thereby, the skid plate will form part of the bayonet interface of the end piece housing. It may be preferable to make the skid plate of a relatively strong material, such as metal, for example aluminium plate. Thanks to the support tabs, the end piece housing need not be made of an equally strong material. According to the embodiments, the wall of the end piece housing may have several skid plate access apertures, and the skid plate may comprise several support tabs extending radially inwards through respective skid plate access apertures.

According to embodiments, the upper skid plate clamping element may comprise a cover tab configured to abut and cover at least a portion of an upper face of the support tab. Thereby, the bayonet interface of the end piece lid may engage with the surface of the cover tab instead of the surface of the support tab. This may reduce wear on the bayonet interface of the end piece lid.

According to embodiments, the end piece lid, when in the open position, may be connected to the skid plate arrangement via a flexible strap.

According to embodiments, the axial position of the end piece, in relation to the cutter drive shaft, may be reconfigurable to enable the end piece to clamp the skid plate arrangement and the knife carrier arrangement against the axial stop shoulder. The axial position of the end piece may be reconfigurable by turning the end piece in a threaded engagement with the cutter drive shaft.

According to embodiments, the end piece may be in threaded engagement with the cutter drive shaft.

According to embodiments, the end piece may be configured to be axially held to the cutter drive shaft by a screw configured to engage with an inner thread of the cutter drive shaft. The end piece may be formed by a screw head integrally formed with the screw. In an alternative embodiment, the cutter drive shaft may be provided with an outer thread, and the end piece may be configured as a nut provided with an inner thread mating with the outer thread of the cutter drive shaft.

According to embodiments, the knife carrier arrangement may have an internal thread, and the screw may be configured as an unlosable screw having a screw head, a threaded section mating with the internal thread of the knife carrier arrangement, and a reduced-width section between the screw head and the threaded section, the reduced-width section having a radial width inferior to the radial width of the threaded section. Thereby, the knife carrier arrangement may remain attached to the skid plate arrangement after having removed the two from the cutter drive shaft. The threaded section may be configured to mate with each of the internal thread of the cutter drive shaft and the internal thread of the knife carrier arrangement.

According to a second aspect, parts or all of the above mentioned problems are solved, or at least mitigated, by a lawnmower cutter assembly adapted to move one or several grass cutting knives in a cutting plane to cut grass, and comprising: a knife carrier arrangement configured to carry one or several grass cutting knives, the knife carrier arrangement configured to be rotated about a cutter rotation axis by a cutter drive shaft; a skid plate arrangement comprising a skid plate suspended, when in use, below the knife carrier arrangement, the skid plate arrangement being rotatably connected to the knife carrier arrangement to enable rotation of the knife carrier arrangement in relation to the skid plate about the cutter rotation axis, wherein the skid plate arrangement and the knife carrier arrangement are configured to be axially held to the cutter drive shaft via one single fastener. Such an arrangement facilitates removing the knife carrier arrangement for servicing.

According to a third aspect, parts or all of the above mentioned problems are solved, or at least mitigated, by a lawnmower cutter assembly adapted to move one or several grass cutting knives in a cutting plane to cut grass, and comprising: a knife carrier arrangement configured to carry one or several grass cutting knives, the knife carrier arrangement configured to be rotated about a cutter rotation axis by a cutter drive shaft; a skid plate arrangement comprising a skid plate suspended, when in use, below the knife carrier arrangement, the skid plate arrangement being rotatable relative to the knife carrier arrangement via a bearing, to enable rotation of the knife carrier arrangement in relation to the skid plate about the cutter rotation axis, the bearing being arranged in a bearing housing, wherein the skid plate arrangement comprises a skid plate clamp arrangement comprising a lower skid plate clamping element and an upper skid plate clamping element, which skid plate clamping elements clamp the skid plate between them, wherein the bearing housing is integrally formed with the lower skid plate clamping element. Such an arrangement reduces the height required by the lawnmower cutter assembly, thereby enabling obtaining an overall lower height of the lawnmower.

According to a fourth aspect, parts or all of the above mentioned problems are solved, or at least mitigated, by a lawnmower cutter assembly adapted to move one or several grass cutting knives in a cutting plane to cut grass, comprising: a knife carrier arrangement configured to carry one or several grass cutting knives, the knife carrier arrangement configured to be rotated about a cutter rotation axis by a cutter drive shaft; a skid plate arrangement comprising a skid plate suspended, when in use, below the knife carrier arrangement, the skid plate arrangement being rotatably connected to the knife carrier arrangement to enable rotation of the knife carrier arrangement in relation to the skid plate about the cutter rotation axis, wherein the skid plate arrangement and the knife carrier arrangement are axially held together by an unlosable screw. Such an arrangement facilitates handling of the lawnmower cutter assembly, particularly when bringing multiple cutting assemblies of a fleet of multiple lawnmowers in for service. The unlosable screw may be configured to engage with an inner thread of the cutter drive shaft. The unlosable screw may have a screw head, a threaded section mating with an internal thread of at least one of the knife carrier arrangement and the skid plate arrangement, and a reduced-width section between the screw head and the threaded section, the reduced-width section having a radial width inferior to the radial width of the threaded section.

According to a fifth aspect, parts or all of the above mentioned problems are solved, or at least mitigated, by a lawnmower cutter assembly adapted to move one or several grass cutting knives in a cutting plane to cut grass, comprising: a knife carrier arrangement configured to carry one or several grass cutting knives, the knife carrier arrangement configured to be rotated about a cutter rotation axis by a cutter drive shaft; a skid plate arrangement comprising a skid plate suspended, when in use, below the knife carrier arrangement, the skid plate arrangement being rotatable relative to the knife carrier arrangement via a bearing, to enable rotation of the knife carrier arrangement in relation to the skid plate about the cutter rotation axis, the bearing being arranged in a bearing housing; and a bearing housing lid movable between a closed position, in which it covers a lower side of the bearing housing, and an open position, in which it exposes the bearing housing for access from below, wherein the bearing housing lid is configured to be axially supported, when in the closed position, by an edge of the skid plate. By way of example, the skid plate may have a central aperture defining an inner skid plate edge, with which the bearing housing lid may engage.

According to a sixth aspect, parts or all of the above mentioned problems are solved, or at least mitigated, by a lawnmower cutter assembly adapted to move one or several grass cutting knives in a cutting plane to cut grass, comprising: a knife carrier arrangement configured to carry one or several grass cutting knives, the knife carrier arrangement configured to be rotated about a cutter rotation axis by a cutter drive shaft; a skid plate arrangement comprising a skid plate suspended, when in use, below the knife carrier arrangement, the skid plate arrangement being rotatable relative to the knife carrier arrangement via a bearing, to enable rotation of the knife carrier arrangement in relation to the skid plate about the cutter rotation axis, the bearing being arranged in a bearing housing; and a bearing housing lid movable between a closed position, in which it covers a lower side of the bearing housing, and an open position, in which it exposes the bearing housing for access from below, wherein the skid plate arrangement comprises a skid plate clamp arrangement comprising a lower skid plate clamping element and an upper skid plate clamping element, which skid plate clamping elements clamp the skid plate between them, wherein the skid plate clamping elements are configured to clamp the skid plate between them when the bearing housing lid is in the open position. Thereby, removal of the bearing housing lid does not release the skid plate from the skid plate clamp arrangement. This facilitates removal and service of the lawnmower cutter assembly, for example for replacing grass cutting knives.

According to a seventh aspect, parts or all of the above mentioned problems are solved, or at least mitigated, by a robotic lawnmower comprising a lawnmower cutter assembly as defined hereinabove. The robotic lawnmower may be a high-capacity lawnmower comprising a plurality of lawnmower cutting assemblies as defined above.

According to an eighth aspect, parts or all of the above mentioned problems are solved, or at least mitigated, by a method of attaching a lawnmower cutter assembly to a lawnmower, the method comprising: positioning a knife carrier arrangement and a skid plate arrangement on a cutter drive shaft; and thereafter, axially locking the axial position of the knife carrier arrangement and the skid plate arrangement in relation to the cutter drive shaft.

According to embodiments, the knife carrier arrangement and the skid plate arrangement may be positioned on the cutter drive shaft in one single manoeuvre. The knife carrier arrangement and the skid plate arrangement may be axially locked to the cutter drive shaft using a single fastener.

It is noted that embodiments of the invention may be embodied by all possible combinations of features recited in the claims. Further, it will be appreciated that the various embodiments described for the lawnmower cutter assembly according to the first, second, third, fourth, fifth and sixth aspects are all combinable with each other, as well as with the method as defined in accordance with the eighth aspect of the present invention, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 9 is a flow chart illustrating a method of attaching a lawnmower cutter assembly to a lawnmower;

FIG. 10 is a perspective view of a cutter drive shaft, a portion of a knife carrier arrangement, and an end piece according to a second embodiment; and FIG. 11 is a perspective view of a cutter drive shaft, a portion of a knife carrier arrangement, and an end piece according to a third embodiment.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figures 1, 2:
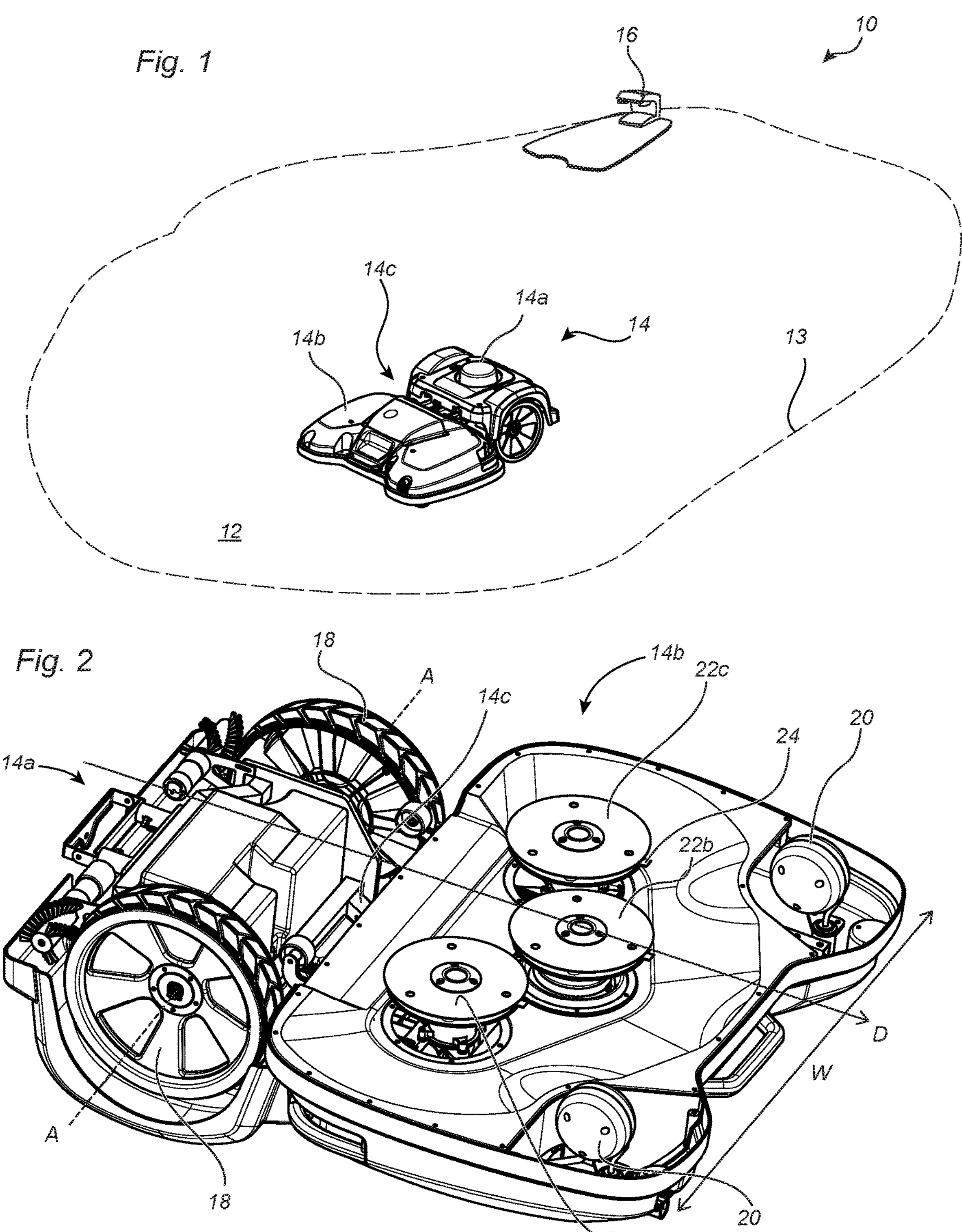
FIG. 1 is a view in perspective of a robotic lawnmower system comprising a robotic lawnmower.
FIG. 2 is a perspective view of the robotic lawnmower of FIG. 1 as seen obliquely from below.

FIG. 1 schematically illustrates an overview of a robotic lawnmower system 10 configured to mow a lawn within a work area 12 such as a garden, a park, a football field or a golf court, the work area 12 being defined by a work area boundary 13. The robotic lawnmower system 10 comprises a self-propelled robotic lawnmower 14 and a battery charging station 16. In the illustrated embodiment, the robotic lawnmower 14 is a multi-chassis lawnmower comprising a drive unit 14*a* and a cutting deck 14*b*, which are connected to each other via a joint arrangement 14*c*.

FIG. 2 illustrates the robotic lawnmower 14 as seen from below. As is apparent from the bottom view, the drive unit 14*a* comprises a single pair of drive wheels 18 which are driven by respective wheel motors (not illustrated) for propelling the robotic lawnmower 14 across the work area 12 (FIG. 1). The drive wheels 18 are arranged to rotate about a drive wheel axis A, which is perpendicular to a main propulsion direction D of the robotic lawnmower 14. The cutting deck 14*b* comprises a set of caster wheels 20 configured to roll on the ground to support the cutting deck 14*b* during operation of the lawnmower 14. In the illustrated embodiment, the robotic lawnmower 14 a high-capacity robotic lawnmower provided with multiple cutter assemblies 22*a*, 22*b*, 22*c*, which may be distributed along the width W of the cutting deck to enable a wide cutting width. Each cutter assembly 22*a-c* holds a set of grass cutting knives 24, and is configured to, when in the normal operating position of FIG. 1, rotate the respective set of grass cutting knives 24 in a substantially horizontal cutting plane to cut grass. The cutting assemblies 22*a*-22*c* may be substantially identical; hence, for reasons of simplicity, only one cutting assembly 22 (FIG. 3) will be described in the following, and it will be appreciated that all details of the cutter assembly 22 may be applicable to each of the three cutter assemblies 22*a-c* of FIG. 2.

Figures 3, 4:
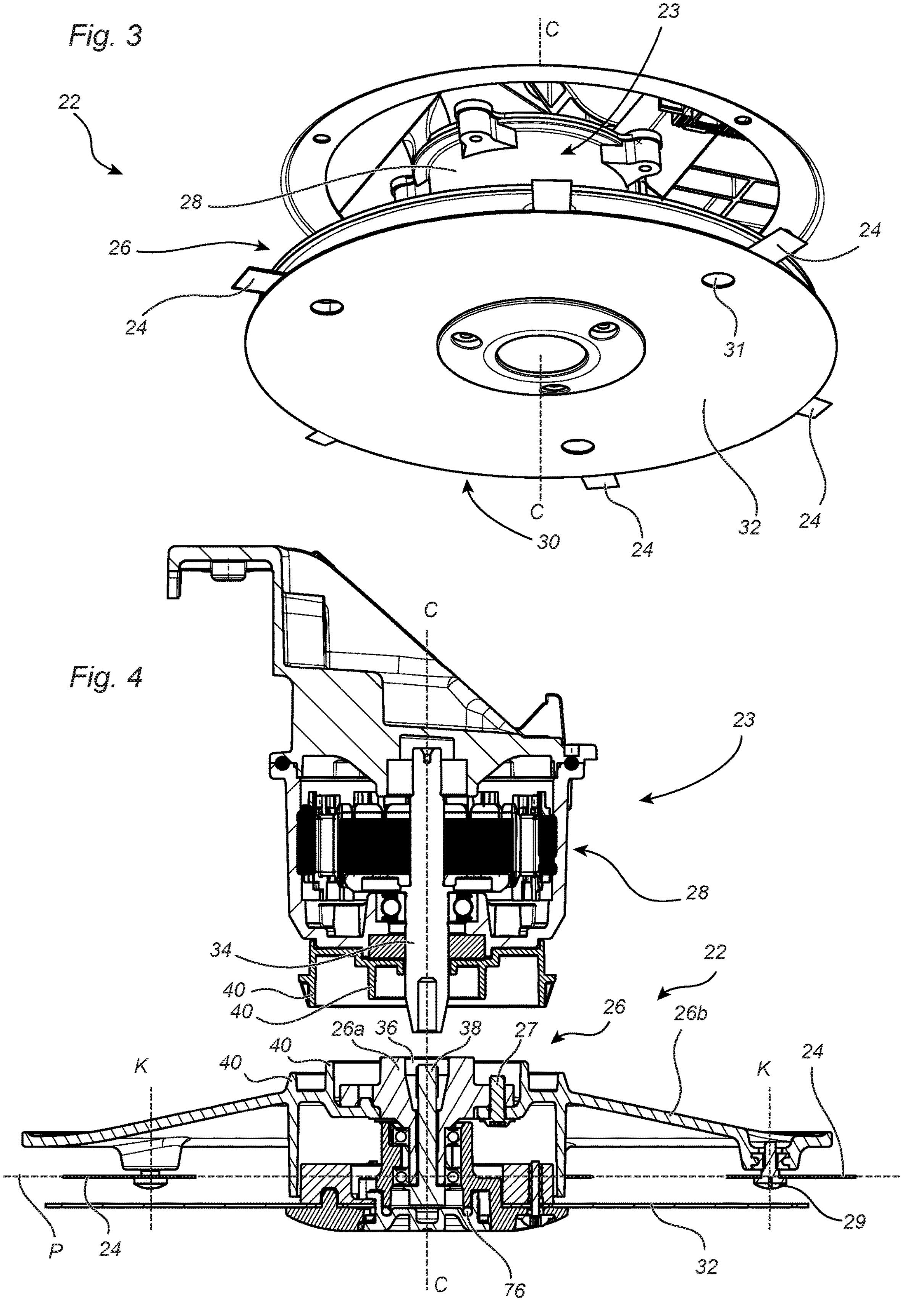
FIG. 3 is a perspective view of a first embodiment of a lawnmower cutter assembly and a cutter drive assembly of the robotic lawnmower of FIGS. 1 and 2 as seen obliquely from below.
FIG. 4 illustrates a section of the lawnmower cutter assembly and cutter drive assembly of FIG. 3 in a disconnected state, the section taken along a vertical plane coinciding with a cutter rotation axis.

FIG. 3 illustrates a lawnmower cutter assembly 22 as seen obliquely from below, when the robotic lawnmower 14 is i in the normal working posture of FIG. 1. FIG. 3 also illustrates a portion of a cutter drive assembly 23, including the housing of a cutter drive motor 28, which motor holds and drives the cutter assembly 22. The cutter assembly 22 comprises a knife carrier arrangement 26 carrying a plurality of grass cutting knives 24. The knife carrier arrangement 26 is operably connected to the cutter drive motor 28 via a drive shaft (not illustrated), such that the cutter drive motor 28 may transfer rotary power to the knife carrier arrangement 26 to rotate the grass cutting knives 24 about a common cutter rotation axis C. Thereby, the grass cutting knives 24 are rotated in a common cutting plane (not illustrated) perpendicular to the cutter rotation axis C. The cutter assembly 22 further comprises a skid plate arrangement 30 comprising a skid plate 32 which is suspended below the knife carrier arrangement. The skid plate arrangement 30 is rotatably connected to the knife carrier arrangement 26 to enable the knife carrier arrangement 26 to rotate about the cutter rotation axis C without rotating the skid plate 32. Thereby, the skid plate 32 shields the rotating knife carrier arrangement 26 from excessive engagement with the grass (not illustrated), such that friction between the grass and the knife carrier arrangement 26 is kept low. Typically, the skid plate 32 may be made of a reasonably strong material, such as sheet metal.

FIG. 4 illustrates a vertical section of the cutter drive assembly 23 and the cutter assembly 22, wherein the cutter assembly 22 is illustrated separated from the cutter drive assembly 23. A tapering end of a cutter drive shaft 34, rotated by the cutter drive motor 28, is configured to be inserted into a likewise tapering drive shaft socket 36 of the knife carrier arrangement 26, and attached thereto via a shaft connector screw 38 concentric with the cutter rotation axis C. As may be better seen in the magnified view of FIG. 5, the tapering section of the drive shaft socket 36 radially aligns the knife carrier arrangement 26 to the cutter drive shaft 34 when the knife carrier arrangement 26 is pressed upwards, towards the cutter drive shaft 34, and thereby operates as an alignment section 61. Referring again to FIG. 4, the knife carrier arrangement 26 comprises a hub portion 26*a* and a knife disc 26*b*, which are rigidly interconnected by screws 27. Grass cutting knives 24 are pivotally attached along the radial periphery of the knife carrier arrangement 26 by knife attachment screws 29, the pivotal attachment enabling the knives 24 to pivot about respective knife pivot axes K defined by the respective knife attachment screws 29. Each of the cutter rotation axis C and the knife pivot axes K is substantially perpendicular to the cutting plane P. Referring back to FIG. 3, the knife attachment screws 29 can be accessed via holes 31 in the skid plate 32, for replacement of the respective knives 24.

Still referring to FIG. 4, the lower face of the cutter drive assembly 23 and the upper face of the knife carrier arrangement 26 are provided with axially extending structures 40, coaxial with the cutter rotation axis C, configured to intermesh with each other, to form a labyrinth seal against dirt entering the interface between the cutter drive shaft 34 and the drive shaft socket 36.

Figure 5:
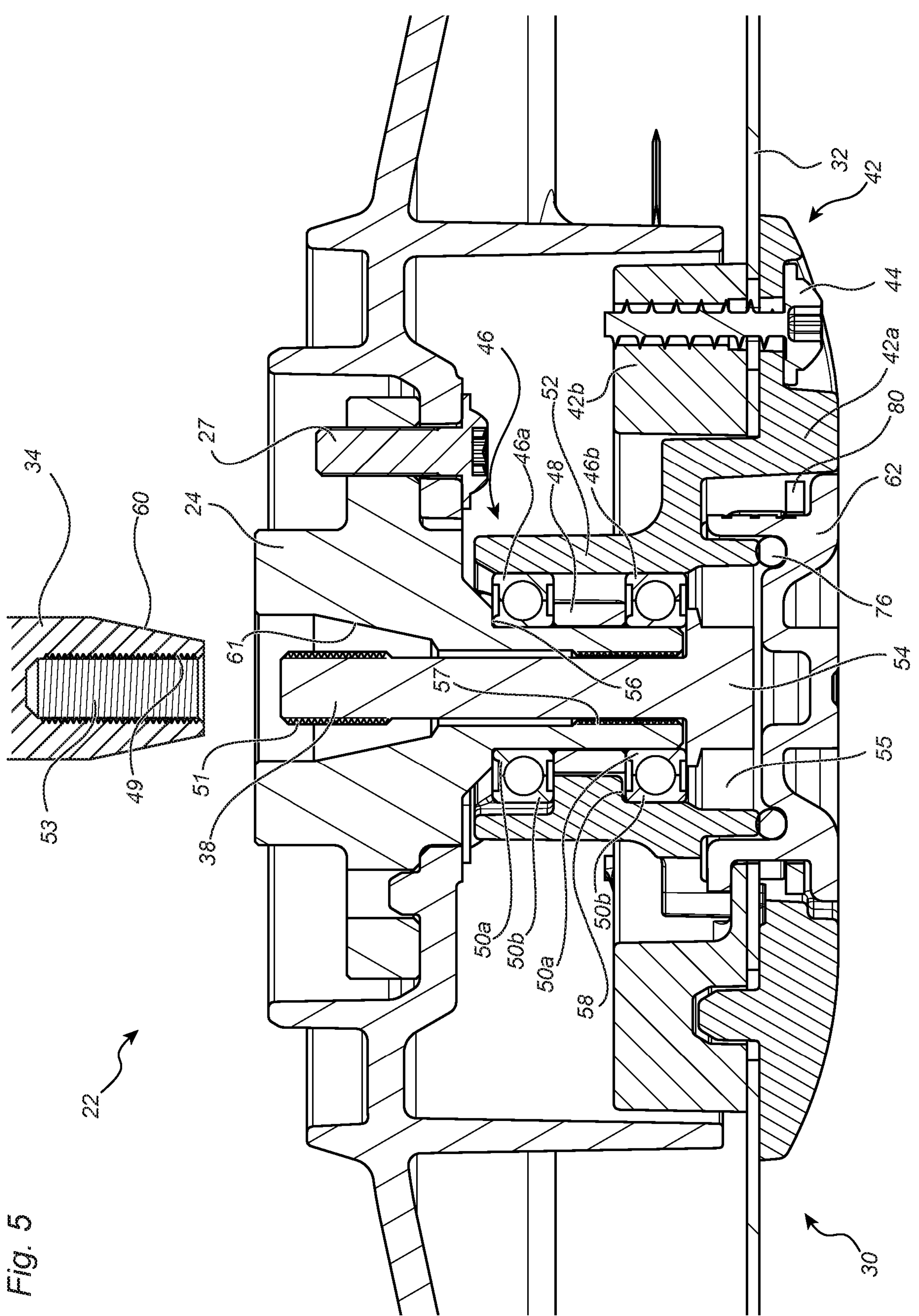
FIG. 5 is a magnified view of a portion of the cutter assembly of FIG. 4.

Now referring to FIG. 5, illustrating a magnified portion of FIG. 4, the skid plate arrangement 30 further comprises a skid plate clamp arrangement 42 comprising a lower skid plate clamping element 42*a* and an upper skid plate clamping element 42*b*, which clamp the skid plate 32 between them. The skid plate clamping elements 42*a*, 42*b* are tightened together by means of clamping screws 44, the screw heads of which are accessible from below. In the alternative, the heads of the clamping screws 44 may be accessible from above, which may in a more intuitive manner guide disassembly of the cutting assembly 22 as will be apparent further below. The skid plate arrangement 30 is rotatably connected to the knife carrier arrangement 26 via a bearing arrangement 46 comprising an upper bearing 46*a* and a lower bearing 46*b*, which are axially separated by an axial support sleeve 48. Each of the bearings 46*a*, 46*b* has a respective inner race 50*a* rotationally fixed to the knife carrier arrangement 26, and thereby to the cutter drive shaft 34, and a respective outer race 50*b* rotationally fixed to the skid plate arrangement 30. The bearings 46*a*, 46*b* are arranged in a circular-cylindrical bearing housing 52, which is integrally formed with the lower skid plate clamping element 42*a*.

FIG. 5 also illustrates in greater detail the screw interface 53 of the cutter drive shaft 34, which screw interface 53 is provided with internal threads 49 for engaging with external threads of a threaded section 51 of the shaft connector screw 38. When carried by the cutting deck 14*b* (FIG. 1), the skid plate arrangement 30 and the knife carrier arrangement 26 are attached solely to the cutter drive shaft 34, and solely by means of the shaft connector screw 38. The shaft connector screw 38 has a screw head 54, which operates as an end piece axially abutting against, and vertically carrying, the inner race 50*a* of the lower bearing 46*b* of the bearing arrangement 46. The inner race 50*a* of the lower bearing 46*b* axially abuts, and vertically carries, the axial support sleeve 48, which in turn axially abuts, and vertically carries, the inner race 50*a* of the upper bearing 46*a*. The inner race 50*a* of the upper bearing 46*a* axially abuts, and vertically carries, an axial support shoulder 56 of the knife carrier arrangement 26, whereas the skid plate arrangement 30 is vertically carried by the outer race 50*b* of the lower bearing 46*b* via a lower axial support shoulder 58 of the bearing housing 52. Thereby, the screw head 54 vertically carries the bearing arrangement 46, which vertically carries both the skid plate arrangement 30 and the knife carrier arrangement 26 in a rotational relationship with each other. The tapering end of the cutter drive shaft 34 forms, when connected to the drive shaft socket 36 of the knife carrier arrangement 26, an upper axial stop shoulder 60 for the knife carrier arrangement 26. Thereby, the skid plate arrangement 30, the knife carrier arrangement 26, and the bearing arrangement 46 are axially held between the axial stop shoulder 60 of the cutter drive shaft 34 and the end piece formed by the screw head 54. If the shaft connector screw 38 is tightened firmly to the cutter drive shaft 34, the inner races 50*a* of the bearing arrangement 46, and the knife carrier arrangement 26, are firmly clamped to the cutter drive shaft 34, to form a completely rigid connection therewith. A lower portion of the bearing housing 52 also receives the screw head 54, such that the lower portion of the bearing housing 52 defines an end piece housing 55. The end piece housing 55 is provided with an end piece lid 62, which is movable between a closed position, illustrated in FIG. 5, in which it covers a lower side of the end piece housing 55, and an open position (FIG. 8B), in which it exposes the screw head 54 for access from below. Clearly, the end piece lid 62 also operates as a bearing housing lid.

Similar to the cutter drive shaft 34, also the knife carrier arrangement 26 has an internal thread 57 mating with the external thread of the threaded section 51 of the shaft connector screw 38. The shaft connector screw 38 further has a reduced-width section 59 extending between the screw head 54 and the threaded section 51. The reduced-width section 59 of the shaft connector screw 38 has a radial width inferior to the radial width of the internal thread 57 of the knife carrier arrangement 26, and an axial length exceeding the axial length of the internal thread 57 of the knife carrier arrangement 26. Thereby, the threaded section 51 of the screw may be screwed all the way through the internal thread 57 of the knife carrier arrangement 26, to become an unlosable screw held to the knife carrier arrangement 26, and still enabling attachment to the cutter drive shaft 34. When in the unlosable position, the shaft connector screw 38 still holds the skid plate arrangement 26 and the knife carrier arrangement 30 together if removed from the cutter drive shaft 34.

Figure 6:
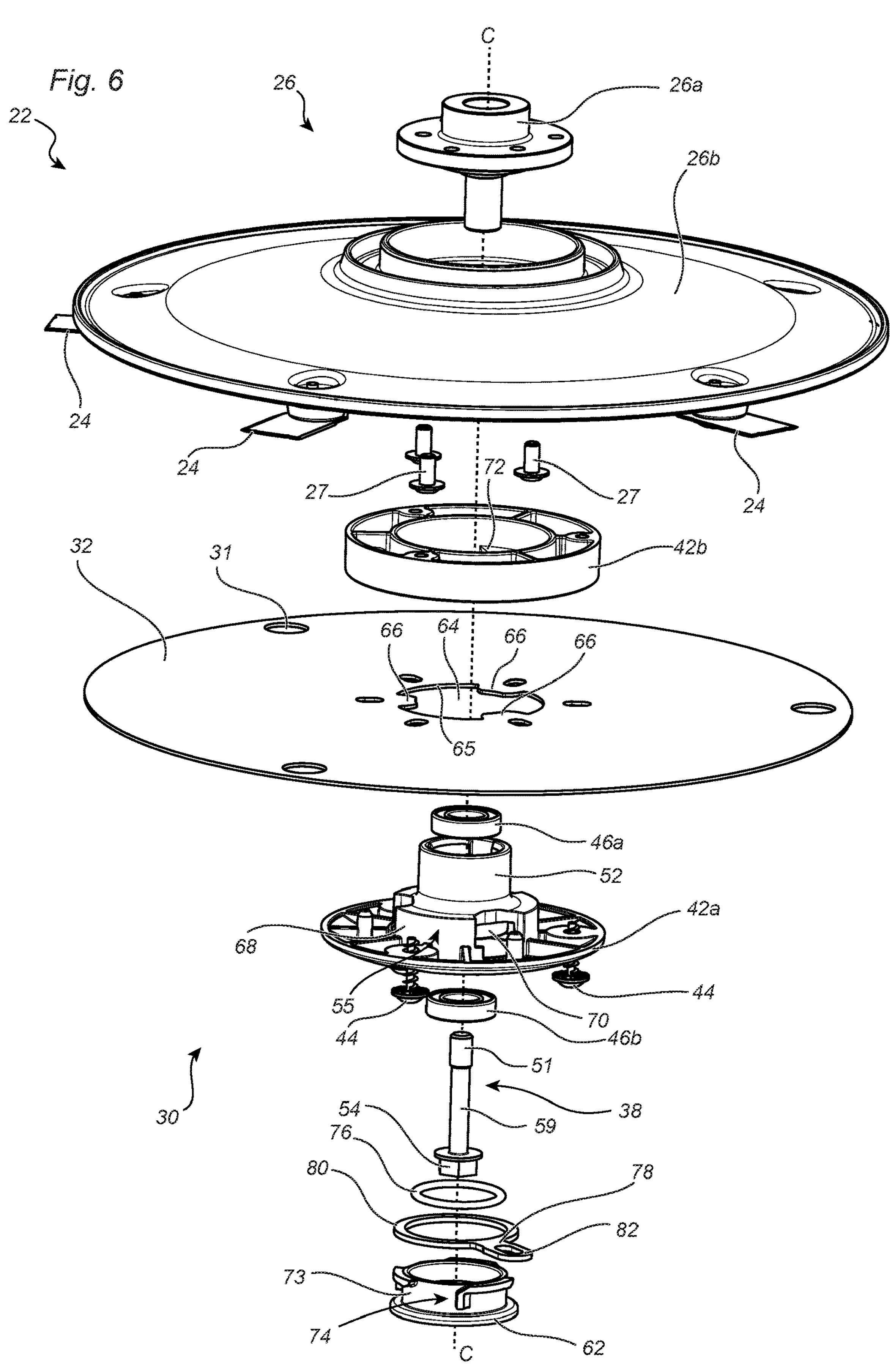
FIG. 6 is an exploded view of the cutter assembly of FIGS. 3-5 as seen in perspective, obliquely from above.
Figure 7:
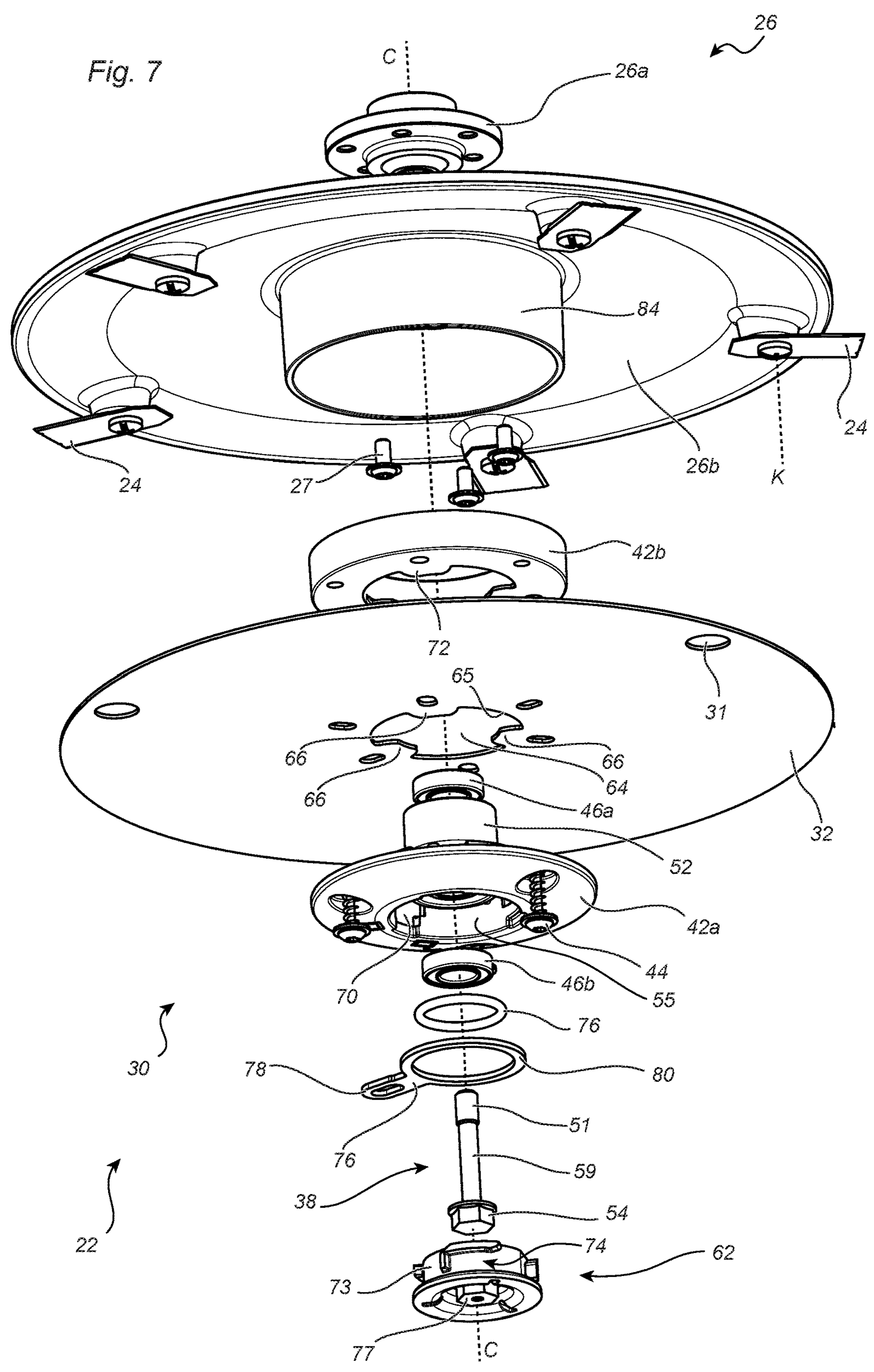
FIG. 7 is an exploded view of the cutter assembly of FIGS. 3-6 as seen in perspective, obliquely from below.

FIG. 6 is an exploded view of the lawnmower cutter assembly 22 as seen obliquely from above, and FIG. 7 is an exploded view of the lawnmower cutter assembly as seen obliquely from below. The skid plate 32 has a central aperture 64, defined by an inner skid plate edge 65, and three support tabs 66 of the skid plate 30 extend radially towards the centre of the central aperture 64. The tangential wall 68 of the end piece housing 55 is provided with three skid plate access apertures 70, which are adapted to receive the support tabs 66, enabling the support tabs 66 to extend into the end piece housing 55. The upper skid plate clamping element 42*b* is provided with cover tabs 72 coinciding with the support tabs 66, such that when the skid plate 30 is clamped between the clamping elements 42*a*, 42*b*, also the cover tabs 72 extend into the end piece housing 55 to cover an upper face of the support tabs 66.

The end piece lid 62 comprises a circular-cylindrical body 73 provided with an external bayonet interface 74 configured to, when inserted into the end piece housing 55 and twisted about the cutter rotation axis C, engage with the support and cover tabs 66, 72 extending into the end piece housing. The skid plate 32 including the support tabs 66 may be made of e.g. sheet metal, such as aluminium plate, which may give the support tabs 66 a certain resilience in the direction of the cutter rotation axis C, thereby generating added axial bias improving the locking of the bayonet interface 74. A rubber seal 76, configured as an O-ring, seals tightly between the end piece lid 62 and the end piece housing 55, and also generates even further axial bias to lock the bayonet interface 74. As is apparent from FIG. 5, the rubber seal 76 is arranged inside the circular-cylindrical body 73 of the end piece lid 62.

The end piece lid 62 is functionally independent from the clamping of the skid plate 32 between the upper and lower skid plate clamping elements 42*b*, 42*a*. Thereby, the skid plate clamping elements 42*a*, 42*b* clamp the skid plate 32 between them regardless of whether the end piece housing lid 62 is in the open position or in the closed position, such that removal of the end piece lid 62 does not release the skid plate 32 from the skid plate clamp arrangement 42. As visible in the view of FIG. 7, the lower face of the end piece lid 62 is provided with a wrench interface 77. As illustrated, the wrench interface 77 may be shaped to mate with a hexagonal socket wrench.

The end piece lid 62 is connected to the skid plate arrangement 30 via a flexible strap 78. A first end of the flexible strap 78 is provided with a first loop 80 configured to enclose the circular-cylindrical body 73 of the end piece lid 62, and a second end of the flexible strap 78 is provided with a second loop 82 configured to be attached to the skid plate arrangement 30. The second loop 82 may, by way of example, extend through a skid plate aperture 70, to be clamped between the skid plate clamping elements 42*a*, 42*b*, or to be attached to the upper skid plate clamping element 42*b* via e.g. a screw (not illustrated).

FIG. 7 also illustrates that the grass cutting knives 24 are rotatably connected to the knife disc 26*b* to enable rotating about the respective knife rotation axes K. A circular-cylindrical outer hub mantle 84, which is integrally formed with the knife disc 26*b*, extends axially along the bearing housing 52, and defines, together with the bearing housing 52, a labyrinth seal protecting the bearings 46*a*, 46*b* against dirt entering from the radial direction; this may be better seen in the section of FIG. 5.

Figures 8A, 8B, 8C:
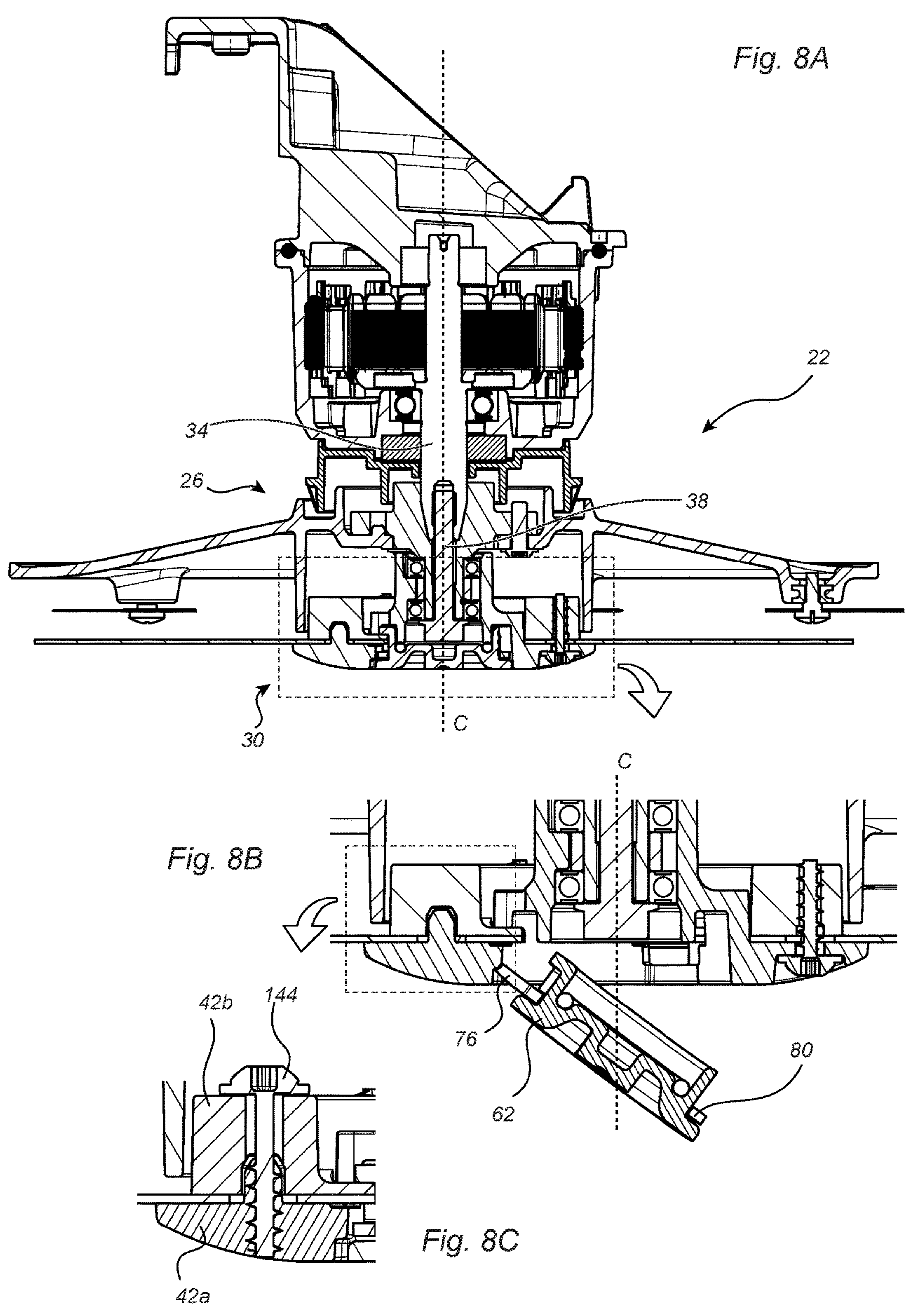
FIG. 8A illustrates a section of the lawnmower cutter assembly and cutter drive assembly of FIG. 4 in an interconnected state, the section again taken along a vertical plane coinciding with the cutter rotation axis, wherein the lawnmower cutter assembly is illustrated with an end piece housing lid in a closed position.
FIG. 8B is a magnified view corresponding to a portion of the view of FIG. 8A, wherein the lawnmower cutter assembly is illustrated with the end piece housing lid in an open position.
FIG. 8C is a magnified view corresponding to a portion of the view of FIG. 8B, and illustrates an alternative position of a clamping screw.

FIG. 8A illustrates the lawnmower cutter assembly 22 after having been connected to the cutting deck 14*b* (FIG. 2) via the cutter drive shaft 34. When connected, the knife carrier arrangement 26 and the skid plate arrangement 30 are axially held to the cutter drive shaft 34 via one single fastener only, i.e. via the shaft connector screw 38 only.

The magnified view of FIG. 8B, corresponding to the area indicated by a dashed rectangle in FIG. 8A, illustrates the end piece lid 62 in the open position, in which the end piece lid 62 has been turned about the cutter rotation axis C to release the bayonet interface 74 from the end piece housing 55. Thereby, the end piece lid 62 is attached to the end piece housing 55 via the flexible strap 78 only.

The magnified view of FIG. 8C corresponds to the area indicated by a dashed rectangle in FIG. 8B, and illustrates an alternative embodiment of the clamp arrangement, according to which alternative embodiment the skid plate clamping elements 42*a*, 42*b* are clamped together by a clamping screw 144 which has been screwed into the clamping elements 42*a*, 42*b* from above.

The flow chart of FIG. 9 illustrates a method of attaching the lawnmower cutter assembly 22 (FIG. 4) to the lawnmower 14 (FIG. 1). With reference to the components illustrated in FIG. 5, the method comprises

901: positioning the knife carrier arrangement 26 and the skid plate arrangement 30 on the cutter drive shaft 34; thereafter, 902: axially locking the axial position of the knife carrier arrangement 26 and the skid plate arrangement 30 in relation to the cutter drive shaft 34.

FIG. 10 illustrates a lower end of the cutter drive shaft and parts of the lawnmower cutter assembly 22 (FIG. 3) according to a second embodiment. The second embodiment may be identical to the first embodiment of e.g. FIG. 4, with the exception of the components illustrated in FIG. 10. According to the second embodiment, the interface between the cutter drive shaft 134 and the knife carrier arrangement 126, here represented by the hub portion 126*a* of the knife carrier arrangement 126, may be keyed. In the illustrated example, the keyed interface is defined by a D-shaped cross-section of the cutter drive shaft 134 engaging with a D-shaped drive shaft socket 136 in the knife carrier arrangement 126. In comparison, in the first embodiment of FIG. 4, the knife carrier arrangement 26 is rigidly attached to the cutter drive shaft 34 via a clamping force from the shaft connector screw 38 only, whereas in the second embodiment of FIG. 10, the keyed interface rotationally interlocks the cutter drive shaft 134 and the knife carrier arrangement 126.

The end piece according to the second embodiment is configured as a clamp 154, which is radially clamped to the flat side 188 of the D-shaped cutter drive shaft 134 by means of an end-piece clamping screw 190. Thereby, no axial clamping pressure is generated by the clamp 154; in fact, the knife carrier 126 and the skid plate arrangement 30 (FIG. 4) may be axially floating along the cutter drive shaft 134. An upper axial end of the D-shaped section of the cutter drive shaft 134 defines an upper axial stop shoulder 160 for the knife carrier arrangement 126 and the skid plate arrangement 30 (FIG. 4), such that the skid plate arrangement 30 and the knife carrier arrangement 126 are axially held between the end piece 154 and the axial stop shoulder 160.

FIG. 11 illustrates a lower end of the cutter drive shaft parts of the lawnmower cutter assembly 22 (FIG. 3) according to a third embodiment. The third embodiment may be identical to the first embodiment of e.g. FIG. 4, with the exception of the components illustrated in FIG. 11. According to the third embodiment, the interface between the cutter drive shaft 234 and the knife carrier arrangement 226, here represented by the hub portion 226*a* of the knife carrier arrangement 226, may be keyed by splines 294 in the drive shaft socket 236 as well as on the cutter drive shaft 234. The cutter drive shaft 234 may be provided with external threads 249, whereas the end piece, here configured as a shaft connector nut 254, may be provided with a mating internal thread. A radially extending collar 260 of the cutter drive shaft 234 may provide an upper axial end stop for the knife carrier arrangement 226 and the skid plate arrangement 30 (FIG. 4). A washer 292 may be provided between the shaft connector nut 254 and the bearing arrangement 46 (FIG. 5).

The invention has mainly been described above with reference to a few embodiments. However, as is readily appreciated by a person skilled in the art, other embodiments than the ones disclosed above are equally possible within the scope of the invention, as defined by the appended patent claims. For example, the cutter drive shaft need not be elongate or have a circular cross-section. Nor does it need to be formed in a single piece; similar to the knife carrier arrangement, the cutter drive shaft may consist of several components attached to each other. In the claims, the word "comprising" does not exclude other elements or steps, and the indefinite article "a" or "an" does not exclude a plurality.

The invention claimed is:

1. A lawnmower cutter assembly adapted to move one or several grass cutting knives in a cutting plane to cut grass, comprising:

a knife carrier arrangement configured to carry one or several grass cutting knives, the knife carrier arrangement configured to be rotated about a cutter rotation axis by a cutter drive shaft;

a skid plate arrangement comprising a skid plate suspended, when in use, below the knife carrier arrangement, the skid plate arrangement being rotatably connected to the knife carrier arrangement to enable rotation of the knife carrier arrangement in relation to the skid plate about the cutter rotation axis, wherein the skid plate arrangement and the knife carrier arrangement are configured to be axially held, when in use, between an axial stop shoulder of the cutter drive shaft and an end piece rigidly connected to the cutter drive shaft, the end piece thereby vertically carrying the skid plate arrangement and the knife carrier arrangement, wherein the knife carrier arrangement comprises a shaft socket configured to receive the cutter drive shaft, wherein the skid plate arrangement comprises a bearing housing, wherein the skid plate arrangement comprises a skid plate clamp arrangement comprising a lower skid plate clamping element and an upper skid plate clamping element, the upper and lower skid plate clamping elements clamping the skid plate between them, wherein the bearing housing is integrally formed with the lower skid plate clamping element, and wherein clamping screws are screwed into the lower skid plate clamping element from above.

2. The lawnmower cutter assembly according to claim 1, wherein the lawnmower cutter assembly is configured to be axially clamped against the axial stop shoulder by the end piece.

3. The lawnmower cutter assembly according to claim 1, wherein the end piece is concentric with the cutter rotation axis.

4. The lawnmower cutter assembly according to claim 1, wherein the knife carrier arrangement is arranged to enable rotational locking of the knife carrier arrangement to the cutter drive shaft.

5. The lawnmower cutter assembly according to claim 1, wherein the shaft socket has a cross-section shaped to mate with a D-shaped cutter drive shaft, and wherein the shaft socket comprises an alignment section which tapers axially downwards.

6. The lawnmower cutter assembly according to claim 1, wherein the skid plate arrangement is rotatably connected to the knife carrier arrangement via a bearing arrangement comprising at least one bearing having an inner race rotationally fixed to the cutter drive shaft, and an outer race rotationally fixed to the skid plate arrangement.

7. The lawnmower cutter assembly according to claim 6, wherein the inner race of the bearing is clamped towards the axial stop shoulder by the end piece, or wherein the end piece axially abuts the bearing arrangement, and the bearing arrangement axially abuts the knife carrier arrangement.

8. A lawnmower cutter assembly adapted to move one or several grass cutting knives in a cutting plane to cut grass, comprising:

a knife carrier arrangement configured to carry one or several grass cutting knives, the knife carrier arrangement configured to be rotated about a cutter rotation axis by a cutter drive shaft;

a skid plate arrangement comprising a skid plate suspended, when in use, below the knife carrier arrangement, the skid plate arrangement being rotatably connected to the knife carrier arrangement to enable rotation of the knife carrier arrangement in relation to the skid plate about the cutter rotation axis, wherein the skid plate arrangement and the knife carrier arrangement are configured to be axially held, when in use, between an axial stop shoulder of the cutter drive shaft and an end piece rigidly connected to the cutter drive shaft, the end piece thereby vertically carrying the skid plate arrangement and the knife carrier arrangement, wherein the skid plate arrangement comprises a bearing housing, wherein the skid plate arrangement comprises a skid plate clamp arrangement comprising a lower skid plate clamping element and an upper skid plate clamping element, the upper and lower skid plate clamping elements clamping the skid plate between them, wherein the bearing housing is integrally formed with the lower skid plate clamping element, wherein clamping screws are screwed into the lower skid plate clamping element from above, wherein at least one of the lower and upper skid plate clamping elements defines an end piece housing, and the lawnmower cutter assembly further comprises an end piece lid pivotable between a closed position, in which the end piece lid covers a lower side of the end piece housing, and an open position, in which the end piece lid exposes the end piece for access from below.

9. The lawnmower cutter assembly according to claim 8, wherein the end piece lid comprises a bayonet interface for connecting to a mating bayonet interface of the end piece housing, wherein a tangential, with regard to the cutter rotation axis, wall of the end piece housing is provided with at least one skid plate access aperture, and the skid plate comprises a central aperture provided with at least one support tab extending radially inwards, through the skid plate access aperture, wherein the bayonet interface of the end piece lid is configured to, when the end piece lid is in the closed position, be axially supported by the support tab.

10. The lawnmower cutter assembly according to claim 9, wherein the upper skid plate clamping element comprises a cover tab configured to abut and cover at least a portion of an upper face of the support tab, and wherein the end piece lid, when in the open position, is connected to the skid plate arrangement via a flexible strap.

11. The lawnmower cutter assembly according to claim 1, wherein the axial position of the end piece, in relation to the cutter drive shaft, is reconfigurable to enable the end piece to clamp the skid plate arrangement and the knife carrier arrangement against the axial stop shoulder.

12. The lawnmower cutter assembly according to claim 1, wherein the end piece is in threaded engagement with the cutter drive shaft.

13. The lawnmower cutter assembly according to claim 1, wherein the end piece is configured to be axially held to the cutter drive shaft by a screw configured to engage with an inner thread of the cutter drive shaft.

14. The lawnmower cutter assembly according to claim 13, wherein the knife carrier arrangement has an internal thread, and the screw is configured as an unlosable screw having a screw head, a threaded section mating with the internal thread of the knife carrier arrangement, and a reduced-width section between the screw head and the threaded section, the reduced-width section having a radial width inferior to a radial width of the threaded section.

15. A lawnmower cutter assembly adapted to move one or several grass cutting knives in a cutting plane to cut grass, and comprising:

a knife carrier arrangement configured to carry one or several grass cutting knives, the knife carrier arrangement configured to be rotated about a cutter rotation axis by a cutter drive shaft;

a skid plate arrangement comprising a skid plate suspended, when in use, below the knife carrier arrangement, the skid plate arrangement being rotatably connected to the knife carrier arrangement to enable rotation of the knife carrier arrangement in relation to the skid plate about the cutter rotation axis, wherein the skid plate arrangement and the knife carrier arrangement are configured to be axially held to the cutter drive shaft via one single fastener, wherein the skid plate arrangement is rotatable relative to the knife carrier arrangement via a bearing, to enable rotation of the knife carrier arrangement in relation to the skid plate about the cutter rotation axis, the bearing being arranged in a bearing housing; and further comprising a bearing housing lid movable between a closed position, in which the bearing housing lid covers a lower side of the bearing housing, and an open position, in which the bearing housing lid exposes the bearing housing for access from below, and wherein the bearing housing lid is configured to be axially supported, when in the closed position, by an edge of the skid plate.

16. The lawnmower cutter assembly of claim 15, wherein the skid plate arrangement comprises a skid plate clamp arrangement comprising a lower skid plate clamping element and an upper skid plate clamping element, the upper and lower skid plate clamping elements clamping the skid plate between them, and wherein the bearing housing is integrally formed with the lower skid plate clamping element.

17. The lawnmower cutter assembly of claim 15, wherein the skid plate arrangement and the knife carrier arrangement are axially held together by an unlosable screw.

18. The lawnmower cutter assembly of claim 15, wherein the skid plate arrangement comprises a skid plate clamp arrangement comprising a lower skid plate clamping element and an upper skid plate clamping element, the lower and upper skid plate clamping elements clamping the skid plate between them, wherein the lower and upper skid plate clamping elements are configured to clamp the skid plate between them when the bearing housing lid is in the open position.

* * * * *